US012624739B2

(12) United States Patent
Schneider et al.

(10) Patent No.: US 12,624,739 B2
(45) Date of Patent: May 12, 2026

(54) CONTROLLABLE VIBRATION DAMPER

(71) Applicants:thyssenkrupp Bilstein GmbH, Ennepetal (DE); thyssenkrupp AG, Essen (DE)

(72) Inventors: Juergen Schneider, Iserlohn (DE); Michael Sturm, Essen (DE)

(73) Assignees: thyssenkrupp Bilstein GmbH, Ennepetal (DE); thyssenkrupp AG, Essen (DE)

( * ) Notice: Subject to any disclaimer, the term of this patent is extended or adjusted under 35 U.S.C. 154(b) by 471 days.

(21) Appl. No.: 18/026,023

(22) PCT Filed: Aug. 31, 2021

(86) PCT No.: PCT/EP2021/074007
§ 371 (c)(1),
(2) Date: Mar. 13, 2023

(87) PCT Pub. No.: WO2022/053352
PCT Pub. Date:Mar. 17, 2022

(65) Prior Publication Data
US 2023/0366444 A1 Nov. 16, 2023

(30) Foreign Application Priority Data
Sep. 14, 2020 (DE) .................... 10 2020 211 490.0

(51) Int. Cl.
F16F 9/46 (2006.01)
F16F 9/06 (2006.01)
(52) U.S. Cl.
CPC .............. F16F 9/461 (2013.01); F16F 9/062 (2013.01)

(58) Field of Classification Search
CPC .................................. F16F 9/461; F16F 9/065
See application file for complete search history.

(56) References Cited

U.S. PATENT DOCUMENTS

| | | | |
|---|---|---|---|
| 2011/0042174 A1 | 2/2011 | Hamers et al. | |
| 2018/0080518 A1 | 3/2018 | Tsuji | |
| 2019/0136932 A1* | 5/2019 | Deferme | F16F 9/46 |

(Continued)

FOREIGN PATENT DOCUMENTS

| | | |
|---|---|---|
| CN | 102472352 A | 5/2012 |
| CN | 108626294 A | 10/2018 |
| DE | 40 22 099 C1 | 12/1991 |

(Continued)

OTHER PUBLICATIONS

English Translation of International Search Report issued in PCT/ EP2021/074007, dated Dec. 7, 2021.

*Primary Examiner* — Melody M Burch
(74) *Attorney, Agent, or Firm* — thyssenkrupp North America, LLC

(57) ABSTRACT

A controllable vibration damper includes a damping force control system, having a damper housing tube. The damper is at least partially filled with a damping medium. A damping valve for damping force control is arranged on and fluidly connected to the damper housing tube. The damper housing tube has an inner tube, which is inserted into the tubular damper housing via a bottom valve element. The vibration damper has a piston rod, which can be moved longitudinally in the inner tube and has a working piston.

16 Claims, 6 Drawing Sheets

(56)             References Cited

U.S. PATENT DOCUMENTS

2020/0208704 A1 *   7/2020   Deferme ................. F16F 9/325
2020/0208705 A1 *   7/2020   Deferme ............... B60G 13/08

FOREIGN PATENT DOCUMENTS

DE       10 2008 015 412 A1    10/2009
DE       10 2010 008 720 A1    12/2010
DE       10 2010 008 723 A1    12/2010
DE       10 2010 020 057 A1     1/2011
DE       10 2010 011 912 A1     9/2011
DE       10 2019 220 484 A1     7/2020
EP               1 538 399 A2     6/2005
EP               3 309 423 A1     4/2018
EP               3 569 890 A1    11/2019
ES               2 066 747 T1     3/1995
JP               2000127734 A  *   5/2000   ............... F16F 9/06
WO               2020/139691 A1     7/2020
WO               2021/011516 A1     1/2021

* cited by examiner

CONTROLLABLE VIBRATION DAMPER

CROSS REFERENCE TO RELATED APPLICATIONS

This application is a U.S. National Stage Entry of International Patent Application Serial Number PCT/EP2021/074007, filed Aug. 31, 2021, which claims priority to German Patent Application No. DE 10 2020 211 490.0, filed Sep. 14, 2020, the entire contents of which are incorporated herein by reference.

FIELD

The present disclosure generally relates to a controllable vibration damper having a damping force control system and a damper housing tube.

BACKGROUND

The prior art discloses vibration dampers in which two control valves arranged hydraulically in parallel with the working piston are provided, through one of which the damping medium flows in the compression stage, during the retraction movement of the piston rod, and through the other of which it flows in the rebound stage, during the extension movement of the piston rod. For this purpose, EP 1 538 399 A1 provides control valves, each accommodated in separate housings. DE 10 2008 015 412 A1 describes a solution in which the two control valves are accommodated in a common housing and are flowed through by suitable inflow in the compression stage or rebound stage. These vibration dampers are constructed as a 2-tube configuration, with an inner tube and a tubular damper housing surrounding the latter. Furthermore, vibration dampers are known which operate according to the "uniflow" principle and are constructed in a 3-tube configuration. In this case, only one control valve is provided, through which the flow is always unidirectional as a result of the uniflow principle, irrespective of the compression stage and rebound stage. While it would therefore be desirable, for the sake of simplification, in the case of vibration dampers of 2-tube configuration, to provide just one control valve, it would be desirable in the case of vibration dampers based on the uniflow principle to embody this in a 2-tube configuration.

Thus a need exists to provide a vibration damper which, as outlined above, makes use of both embodiments.

The present disclosure provides a controllable vibration damper having a damping force control system, comprising a damper housing tube, which is at least partially filled with damping medium, and a damping valve for damping force control, which is arranged on and fluidly connected to the damper housing tube, an inner tube, which is inserted into the tubular damper housing via a bottom valve element, a piston rod, which can be moved longitudinally in the inner tube and has a working piston, wherein according to the invention a separating piston seated in the tubular damper housing separates the damping medium in the low-pressure region from a gas volume held in the tubular damper housing, and the bottom valve element divides the tubular damper housing into a low-pressure working chamber and a high-pressure working chamber, which is acted upon by means of the working piston, and an inlet opening of the damping valve element is fluidly connected to the high-pressure working chamber, and an outlet opening of the damping valve element is fluidly connected to the low-pressure region, such that the damping valve element is connected in parallel with the working piston.

DETAILED DESCRIPTION

Figure 1:
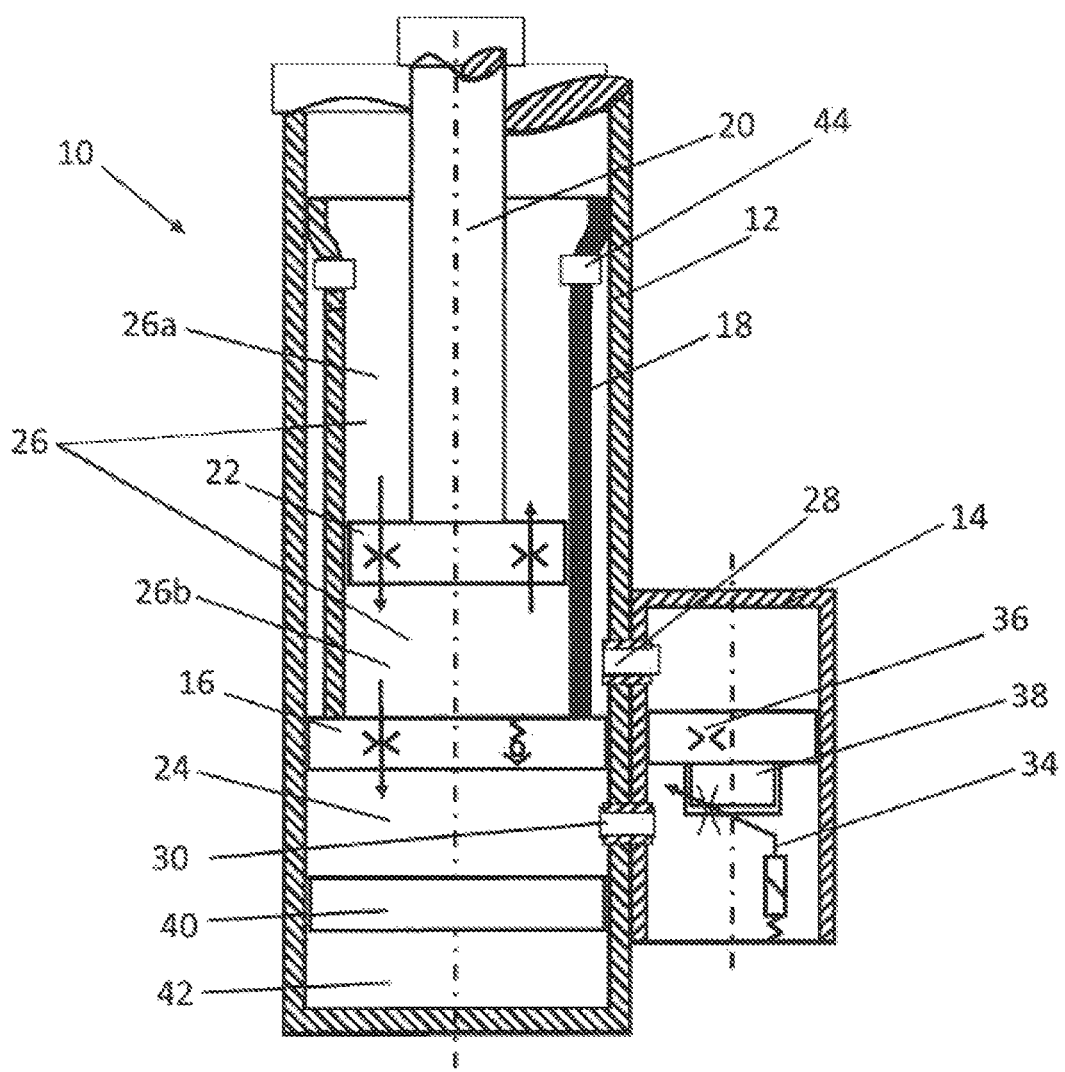
FIG. 1 is a schematic illustration of a vibration damper according to one example of the present disclosure.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The invention relates to a controllable vibration damper having a damping force control system, having a damper housing tube, which is at least partially filled with damping medium, and a damping valve for damping force control, which is arranged on and fluidly connected to the damper housing tube, having an inner tube, which is inserted into the tubular damper housing via a bottom valve element, and having a piston rod, which can be moved longitudinally in the inner tube and has a working piston, wherein the bottom valve element divides the tubular damper housing into a low-pressure working chamber and a high-pressure working chamber, which is acted upon by means of the working piston, and an inlet opening of the damping valve element is fluidly connected to the high-pressure working chamber, and an outlet opening of the damping valve element is fluidly connected to the low-pressure region.

A vibration damper configured according to the invention functions according to the uniflow principle and is designed as a 2-tube configuration. In addition, just one damping valve element or control valve is provided. Overall, a radially slender construction is thus ensured. By arranging a gas volume and separating this gas volume from the low-pressure region, it is possible to dispense with a third cylinder tube.

An advantageous embodiment of the invention provides for the gas volume to be arranged inside the damping valve element or on the outer circumference of the damping tube.

An advantageous embodiment of the invention envisages that the inner tube is inserted into the tubular damper housing via the bottom valve element in such a way that the bottom valve element is inserted into the tubular damper housing on the inner circumference and forms a hydraulic seal with the inner tube. It is advantageous if the inner tube and the bottom valve element form a mounting unit and can be inserted jointly in the axial direction into the tubular damper housing.

An advantageous embodiment of the invention envisages that the damping valve element can be adjusted continuously between a minimum damper characteristic and a maximum damper characteristic. It is thereby possible to set different damping characteristics.

An advantageous embodiment of the invention envisages that the damping valve has at least one controllable valve unit, by means of which the damper characteristic can be switched. It is thereby possible to increase further the number of damping characteristics that can be set.

In one specific embodiment of the invention, provision can be made for the valve unit to comprise a manually, electrically or electromagnetically adjustable valve for switching the damper characteristic.

An advantageous embodiment of the invention envisages that a second valve unit with a defined flow cross section is connected upstream or downstream of the first valve unit in the flow direction of the damping medium. Furthermore, it is deemed expedient if a further, passive valve unit is provided, which is connected in parallel or in series with the first and/or the second valve unit.

FIG. 1 shows a predominantly schematic illustration of one possible embodiment of a vibration damper 10 according to the invention. The vibration damper 10 is embodied in a 2-tube configuration and comprises a tubular damper housing 12, an inner tube 18 and a damping valve element 14. The inner tube 18 is inserted axially into the damping element 14 in a lower region via a bottom valve element 16, wherein the bottom valve element 14 closes the inner tube 18 at the bottom and seals it circumferentially against an inner circumference of the tubular damper housing 12. An intermediate space is formed between the tubular damper housing 12 and the inner tube 18 inserted therein and is closed at the bottom by the bottom valve element 16. The inner tube 18 is filled with damping medium, and a working piston 22 mounted on a piston rod 20 is guided in an axially movable manner in the inner tube 18. The direction of movement of the working piston 22 can be defined as a longitudinal direction of the vibration damper 10. The upper end of the tubular damper housing 12 is sealed by means of a piston rod guide (not illustrated).

During operation, a high-pressure working chamber 26 is formed in the inner tube 18, wherein the working piston 22 divides this chamber into a region 26a on the piston-rod side and a region 26b remote from the piston rod. The high-pressure working region 26 extends via openings 44 in the wall of the inner tube 18 as far as the intermediate space between the inner tube 18 and the tubular damper housing 12. By means of the bottom valve element 16, the high-pressure working chamber 26 is delimited with respect to a low-pressure working chamber 24, which forms within the tubular damper housing 12 during operation. Furthermore, a gas volume 42 is provided in the tubular damper housing 12, which is delimited with respect to the low-pressure working chamber 24 by means of a separating piston 40, which can be moved axially in the tubular damper housing 12.

Mounted on the outside of the tubular damper housing 12 is a damping valve element 14, the function of which is described further below in conjunction with the working movement of the working piston 22. The damping valve element 14 has an inlet opening 28 and an outlet opening 30 and is fluidically connected to the high-pressure working chamber 26 via the inlet opening 28 and fluidically connected to the low-pressure working chamber 24 via the outlet opening 30 via bores correspondingly formed in the tubular damper housing 12.

The damping valve element 14 in the embodiment shown comprises a controllable valve unit 34, a second valve unit 36 with a defined flow cross section, which is arranged downstream of the first controllable valve unit 34 in the flow direction of the damping medium, and an hydraulic intermediate chamber 38 arranged between the two valve units. By means of the controllable valve unit 34, the damping valve element 14 can be positioned between an open position and a closed position.

The circulation of the damping medium in the vibration damper 10 in the compression stage, the rebound stage and with the damping valve element 14 open and closed in each case is described with reference to FIGS. 2 to 5.

Figure 2:
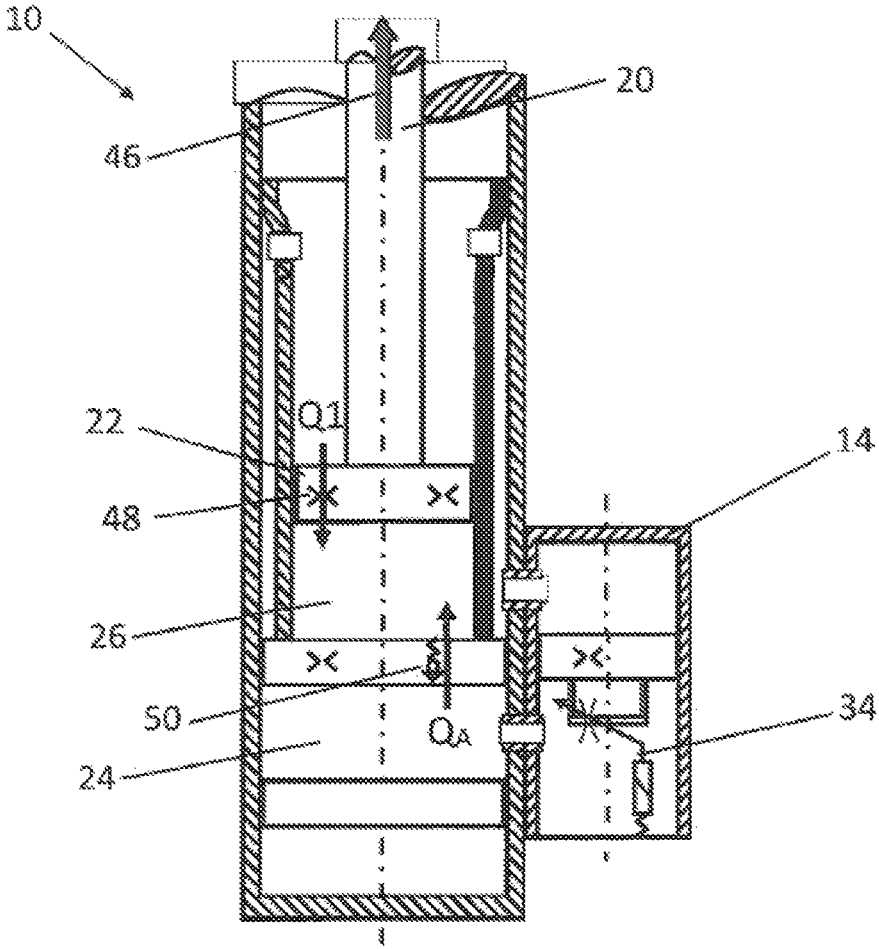
FIG. 2 is a vibration damper according to FIG. 1 shown in the rebound stage and with a damping valve element in the closed position.

FIG. 2 shows the vibration damper 10 in the rebound stage, this being symbolized by the arrow 46 in the region of the piston rod. In addition, the damping valve element 14 or the controllable valve unit 34 is in the closed position. As a result, a hard characteristic is provided by the vibration damper 10 during operation. The piston rod 20 and the working piston 22 perform an upward movement in the direction of the arrow 46. Via a valve element 48 in the working piston 22, the damping medium flows from the region of the high-pressure working chamber 26 on the piston-rod side into the region remote from the piston rod. The flow of the damping medium is symbolized by the arrow $Q_1$. To compensate for the piston rod volume, damping medium flows from the low-pressure working chamber 24 into the high-pressure working chamber 26 through a check valve 50 in the bottom valve element 16. As a result, no damping force is produced. This flow of the damping medium is symbolized by the arrow QA.

Figure 3:
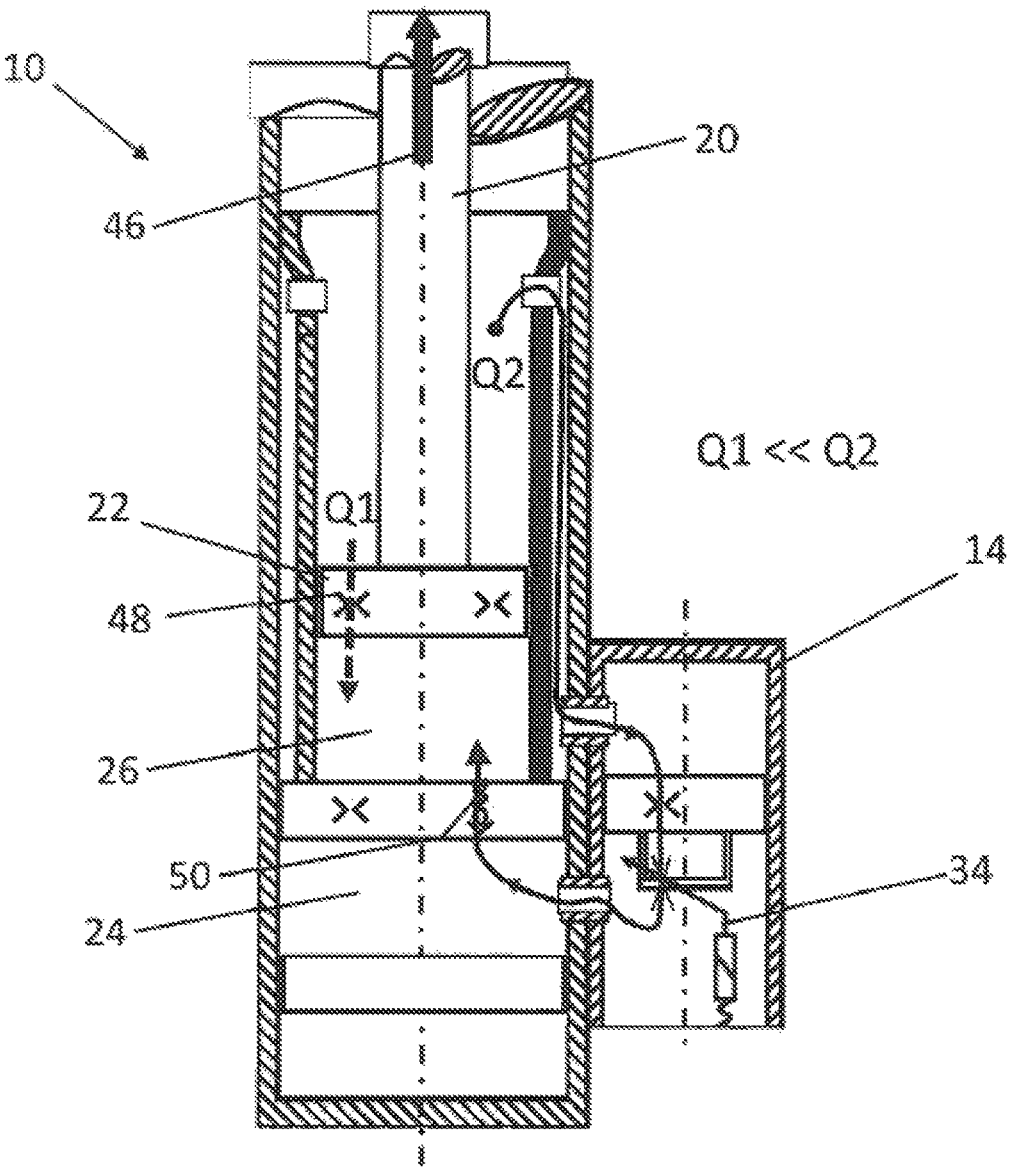
FIG. 3 is a vibration damper according to FIG. 1 shown in the rebound stage and with a damping valve element in the open position.

FIG. 3 likewise shows the vibration damper 10 in the rebound stage, this being symbolized by the arrow 46 in the region of the piston rod. In addition, the damping valve element 14 or the controllable valve unit 34 is in the open position. As a result, a soft characteristic is provided by the vibration damper 10 during operation. The piston rod 20 and the working piston 22 perform an upward movement in the direction of the arrow 46. The damping medium flows from the region of the high-pressure working chamber 26 on the piston-rod side, via the openings 44, into the intermediate space between the inner tube 18 and the tubular damper housing 12 and, via the inlet opening, into the damping valve element 14. The damping medium leaves the damping valve element 14 again via the outlet opening 30 into the low-pressure working chamber 24. The flow of the damping medium then continues via the check valve 50 in the bottom valve element 16 into the region of the high-pressure working chamber 26 remote from the piston rod. The flow of the damping medium is symbolized by the arrow $Q_2$. To compensate for the piston rod volume, damping medium flows from the high-pressure working chamber 24 on the piston-rod side into the high-pressure working chamber 26 remote from the piston rod through the valve element 48 in the working piston 22. As a result, a small damping force is produced. This flow of the damping medium is symbolized by the arrow Q₁. In this operating range of the vibration damper 10, the damping medium flows primarily via the damping valve element 14, i.e. $Q_1 \ll Q_2$. The separating piston 40 moves upward in order to compensate for the volume of the piston rod 20 extending out of the tubular damper housing 12. The division between flows $Q_1$ and $Q_2$ can be varied by means of intermediate positions of the valve unit 34 between the open and closed positions, thus enabling different damper characteristics to be set in the rebound stage.

Figure 4:
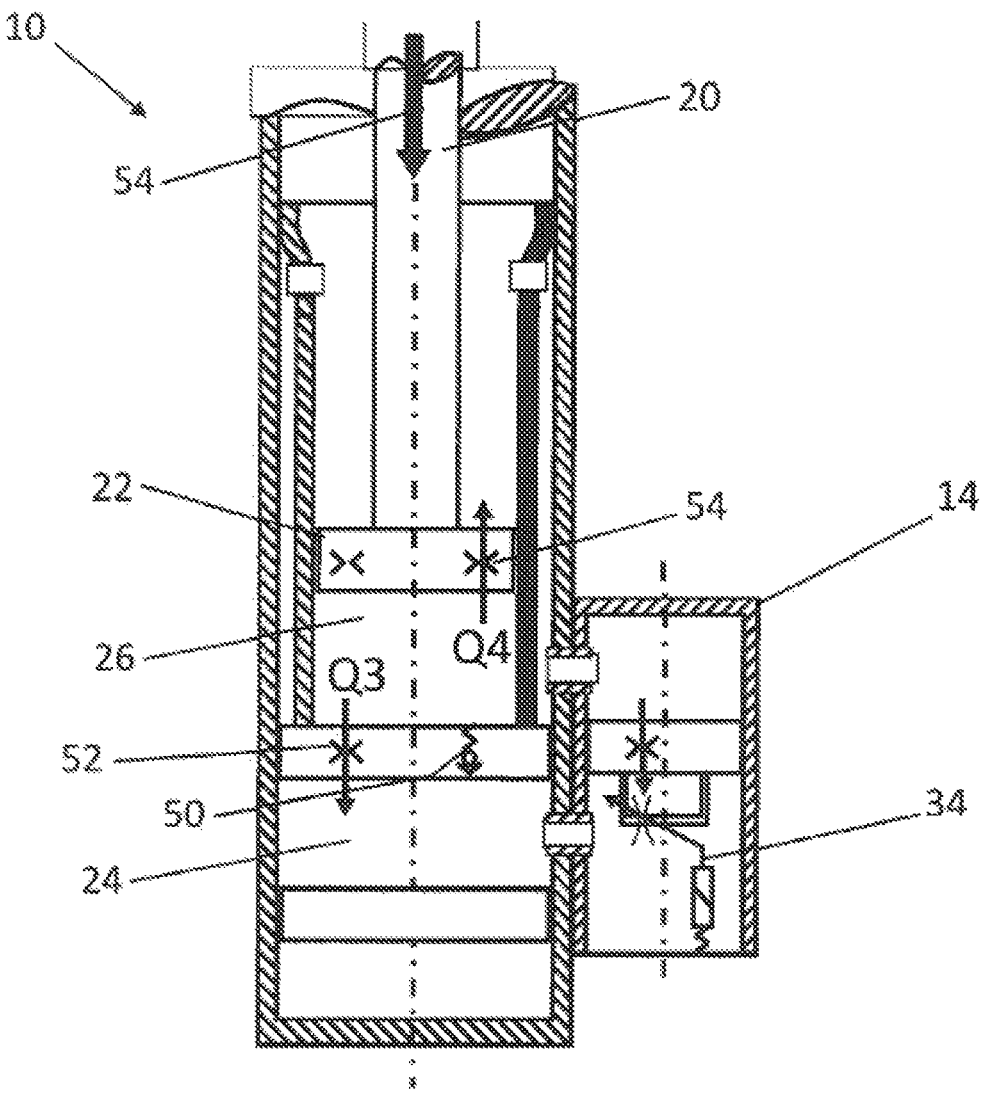
FIG. 4 is a vibration damper according to FIG. 1 shown in the compression stage and with a damping valve element in the closed position.

FIG. 4 shows the vibration damper 10 in the compression stage, this being symbolized by the arrow 54 in the region of the piston rod. In addition, the damping valve element 14 or the controllable valve unit 34 is in the closed position. As a result, a hard characteristic is provided by the vibration damper 10 during operation. The piston rod 20 and the working piston 22 perform a downward movement in the direction of the arrow 46. Via a valve element 52 in the bottom valve element 16, the damping medium flows from the high-pressure working chamber 26 into the low-pressure working chamber 24. The flow of the damping medium is symbolized by the arrow $Q_3$. Via a valve element 54 in the working piston 22, the damping medium furthermore flows to a small extent from the region of the high-pressure working chamber 26 remote from the piston rod into the region on the piston-rod side. The flow of the damping medium is symbolized by the arrow $Q^*_4$. This flow of the damping medium can be used to produce damping force.

Figure 5:
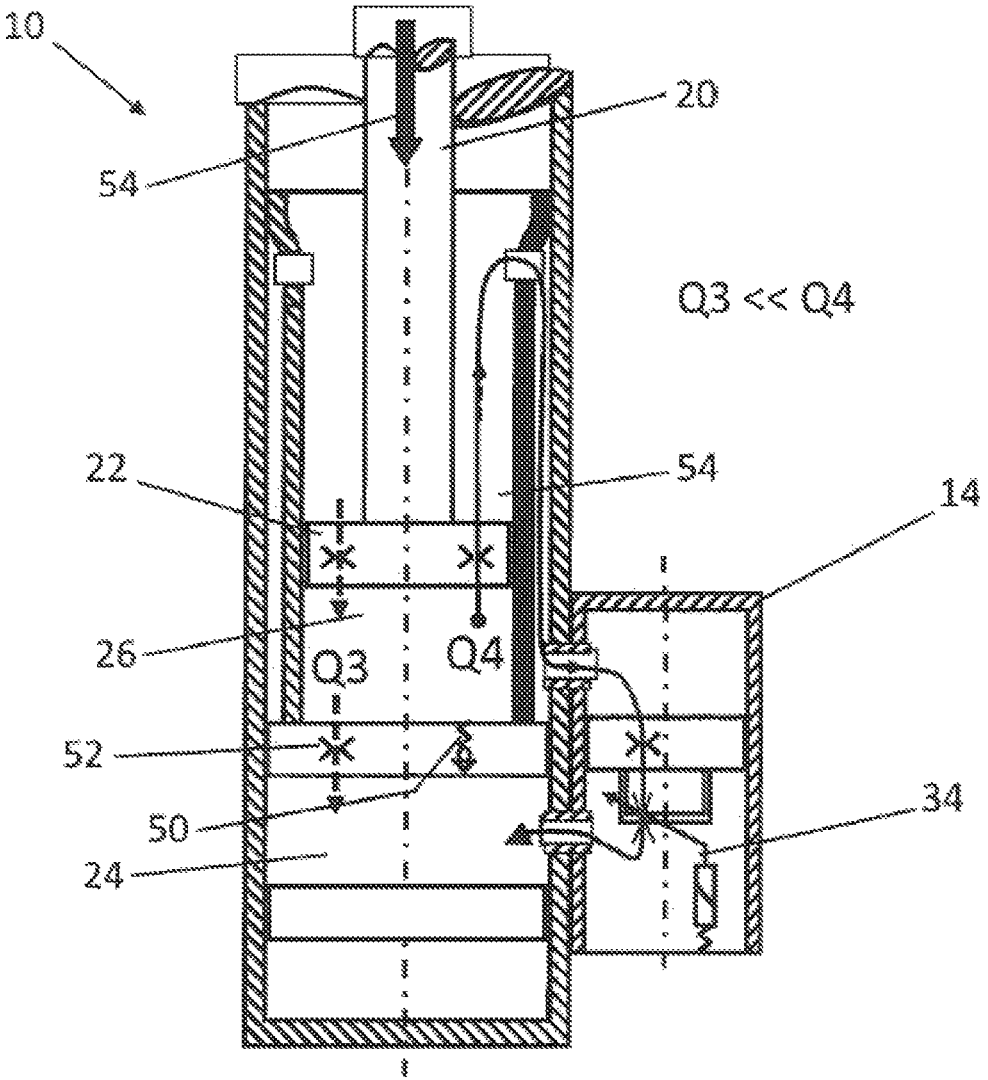
FIG. 5 is a vibration damper according to FIG. 1 shown in the compression stage and with a damping valve element in the closed position.

FIG. 5 shows the vibration damper 10 in the compression stage, this being symbolized by the arrow 54 in the region of the piston rod. In addition, the damping valve element 14 or the controllable valve unit 34 is in the open position. As a result, a soft characteristic is provided by the vibration damper 10 during operation. The piston rod 20 and the working piston 22 perform a downward movement in the direction of the arrow 46. The damping medium flows from the region of the high-pressure working chamber 26 remote from the piston rod, through the valve element 54, into the region of the high-pressure working chamber 26 on the piston-rod side and then, via the openings 44, into the intermediate space between the inner tube 18 and the tubular damper housing 12 and, via the inlet opening, into the damping valve element 14. The damping medium leaves the damping valve element 14 again via the outlet opening 30 into the low-pressure working chamber 24. The flow of the damping medium is symbolized by the arrow $Q_2$. To a small extent, damping medium flows directly from the high-pressure working chamber 26 into the low-pressure working chamber 24 via the valve element 52 in the bottom valve element 16, as flow $Q_3$. In this operating range of the vibration damper 10, the damping medium flows primarily via the damping valve element 14, i.e. $Q_3 \ll Q_4$. The separating piston 40 moves downward in order to compensate for the volume of the piston rod 20 entering the tubular damper housing 12. The division between flows $Q_3$ and $Q_4$ can be varied by means of intermediate positions of the valve unit 34 between the open and closed positions, thus enabling different damper characteristics to be set in the compression stage.

Figure 6:
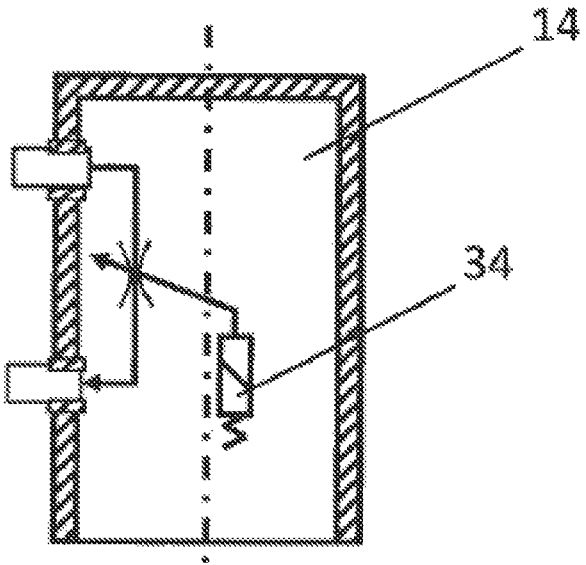
FIG. 6 is an alternative embodiment of the damping valve element.

FIG. 6 shows a simplified embodiment of a damping valve element 14, in which only a controllable valve unit 34 is provided.

LIST OF REFERENCE SIGNS

10 Vibration damper
12 Tubular damper housing

14 Damping valve element
16 Bottom valve element
18 Inner tube
20 Piston rod
22 Working piston
24 Low-pressure working chamber
26 High-pressure working chamber
26a High-pressure region on the piston-rod side
26b High-pressure region remote from the piston rod
28 Inlet opening
30 Outlet opening
32 Valve element
34 Valve unit
36 Valve unit
38 Hydraulic intermediate chamber
40 Separating piston
42 Gas volume
44 Opening
46 Rebound stage
48 Valve element
50 Check valve
52 Valve element
54 Compression stage

What is claimed is:

1. A controllable vibration damper having a damping force control system, the controllable vibration damper comprising:
a tubular damper housing which is at least partially filled with damping medium, and a damping valve element for damping force control, which is arranged on and fluidly connected to the tubular damper housing;
an inner tube, which is inserted into the tubular damper housing via a bottom valve element;
a piston rod, which can be moved longitudinally in the inner tube and has a working piston;
wherein the bottom valve element divides the tubular damper housing into a low-pressure working chamber and a high-pressure working chamber, which is acted upon by means of the working piston; and
a separating piston seated in the tubular damper housing that separates the damping medium in the low-pressure working chamber from a gas volume held in the tubular damper housing;
wherein an inlet opening of the damping valve element is fluidly connected to the high-pressure working chamber, and an outlet opening of the damping valve element is fluidly connected to the low-pressure working chamber, such that the damping valve element is connected in parallel with the working piston;
wherein the damping valve element can be closed during a rebound stage such that the damping medium can be forced to flow through the working piston and through the bottom valve element without flowing through the damping valve element;
wherein the damping valve element can be opened during the rebound stage such that the damping medium can be forced to flow through the working piston, through the bottom valve element, and through the damping valve element.

2. The controllable vibration damper as claimed in claim 1, wherein the inner tube is inserted into the tubular damper housing via the bottom valve element in such a way that the bottom valve element is inserted into the tubular damper housing on the inner circumference and forms a hydraulic seal with the inner tube.

3. The controllable vibration damper as claimed in claim 2 wherein the damping valve element is selectively adjusted continuously between any desired minimum damper characteristic and any desired maximum damper characteristic.

4. The controllable vibration damper as claimed in claim 3, wherein the damper valve element has at least one controllable valve unit, by means of which the damper characteristic is selectively switched.

5. The controllable vibration damper as claimed in claim 4, wherein the at least one controllable valve unit comprises one of a manually, electrically and electromagnetically adjustable valve for switching the damper characteristic.

6. The controllable vibration damper as claimed in claim 5, wherein the at least one controllable valve unit is a first valve unit and the controllable vibration damper further comprises a second valve unit with a defined flow cross section connected one of upstream and downstream of the first valve unit in the flow direction of the damping medium.

7. The controllable vibration damper as claimed in claim 1, wherein:

the damping valve element can be closed during the rebound stage such that the damping medium is forced to flow through the working piston, from a piston-rod side of the working piston to a region remote from the piston rod, and through the bottom valve element, from the low-pressure working chamber into the high-pressure working chamber, without flowing through the damping valve element, such that no damping force is produced by the damping valve element and a hard characteristic is provided by the controllable vibration damper; and the damping valve element can be opened during the rebound stage such that the damping medium is forced to flow through the working piston, from a piston-rod side of the working piston to a region remote from the piston rod, through the bottom valve element, from the low-pressure working chamber into the high-pressure working chamber, and through the damping valve element, from the high-pressure working chamber into the low-pressure working chamber, such that a damping force is produced by the damping valve element and a soft characteristic is provided by the controllable vibration damper.

8. The controllable vibration damper as claimed in claim 1, wherein the inlet opening and the outlet opening are the only openings that fluidly connect the damping valve element to the rest of the controllable vibration damper.

9. A controllable vibration damper having a damping force control system, the controllable vibration damper comprising:

a tubular damper housing which is at least partially filled with damping medium, and a damping valve element for damping force control, which is arranged on and fluidly connected to the tubular damper housing;

an inner tube, which is inserted into the tubular damper housing via a bottom valve element;

a piston rod, which can be moved longitudinally in the inner tube and has a working piston;

wherein the bottom valve element divides the tubular damper housing into a low-pressure working chamber and a high-pressure working chamber, which is acted upon by means of the working piston; and a separating piston seated in the tubular damper housing that separates the damping medium in the low-pressure working chamber from a gas volume held in the tubular damper housing;

wherein an inlet opening of the damping valve element is fluidly connected to the high-pressure working chamber, and an outlet opening of the damping valve element is fluidly connected to the low-pressure working chamber, such that the damping valve element is connected in parallel with the working piston;

wherein the damping valve element can be closed during a compression stage such that the damping medium can be forced to flow through the working piston and through the bottom valve element without flowing through the damping valve element;

wherein the damping valve element can be opened during the compression stage such that the damping medium can be forced to flow through the working piston, through the bottom valve element, and through the damping valve element.

10. The controllable vibration damper as claimed in claim 9, wherein the inner tube is inserted into the tubular damper housing via the bottom valve element in such a way that the bottom valve element is inserted into the tubular damper housing on the inner circumference and forms a hydraulic seal with the inner tube.

11. The controllable vibration damper as claimed in claim 10 wherein the damping valve element is selectively adjusted continuously between any desired minimum damper characteristic and any desired maximum damper characteristic.

12. The controllable vibration damper as claimed in claim 11, wherein the damper valve element has at least one controllable valve unit, by means of which the damper characteristic is selectively switched.

13. The controllable vibration damper as claimed in claim 12, wherein the at least one controllable valve unit comprises one of a manually, electrically and electromagnetically adjustable valve for switching the damper characteristic.

14. The controllable vibration damper as claimed in claim 13, wherein the at least one controllable valve unit is a first valve unit and the controllable vibration damper further comprises a second valve unit with a defined flow cross section connected one of upstream and downstream of the first valve unit in the flow direction of the damping medium.

15. The controllable vibration damper as claimed in claim 9, wherein:

the damping valve element can be closed during the compression stage such that the damping medium is forced to flow through the working piston, from a region remote from the piston rod to a piston-rod side of the working piston, and through the bottom valve element, from the high-pressure working chamber into the low-pressure working chamber, without flowing through the damping valve element, such that no damping force is produced by the damping valve element and a hard characteristic is provided by the controllable vibration damper; and the damping valve element can be opened during the compression stage such that the damping medium is forced to flow through the working piston, from a region remote from the piston rod to a piston-rod side of the working piston, through the bottom valve element, from the high-pressure working chamber into the low-pressure working chamber, and through the damping valve element, from the high-pressure working chamber into the low-pressure working chamber, such that a damping force is produced by the damping valve element and a soft characteristic is provided by the controllable vibration damper.

16. The controllable vibration damper as claimed in claim 9, wherein the inlet opening and the outlet opening are the only openings that fluidly connect the damping valve element to the rest of the controllable vibration damper.

* * * * *